Figure 1:
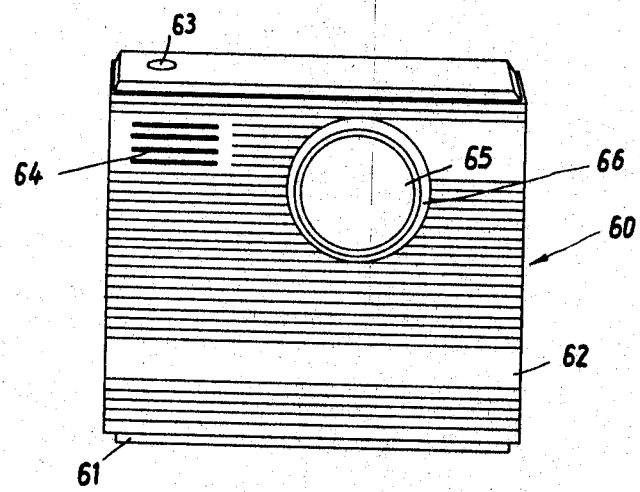

May 23, 1967  H. REMY ET AL  3,321,671
ELECTRICALLY IGNITED LIGHTER
Filed Aug. 30, 1966  5 Sheets-Sheet 1

Inventors:
HERMANN REMY
HANS-JÜRGEN BERGHAUS
OTTO ADLER
MARTIN GRÜNBACHER
BY: Haine and Hydich
ATTORNEYS Inventors:
HERMANN REMY
HANS-JÜRGEN BERGHAUS
OTTO ADLER
MARTIN GRÜNBACHER
BY: Hane and Nydick
ATTORNEYS May 23, 1967

H. REMY ET AL 3,321,671

ELECTRICALLY IGNITED LIGHTER

Filed Aug. 30, 1966

5 Sheets-Sheet 4

Inventors:
HERMANN REMY
HANS-JÜRGEN BERGHAUS
OTTO ADLER
MARTIN GRÜNBACHER

BY:
ATTORNEYS

May 23, 1967  H. REMY ET AL  3,321,671
ELECTRICALLY IGNITED LIGHTER

Filed Aug. 30, 1966  5 Sheets-Sheet 5

Inventors:
HERMANN REMY
HANS-JÜRGEN BERGHAUS
OTTO ADLER
MARTIN GRÜNBACHER
BY: Haure and Nydick
ATTORNEYS United States Patent Office 3,321,671
Patented May 23, 1967

3,321,671
ELECTRICALLY IGNITED LIGHTER
Hermann Remy, Dietzenbach-Steinberg, Hans-Jürgen Berghaus, Offenbach am Main, Otto Adler, Heusenstamm, near Offenbach am Main, and Martin Grünbacher, Offenbach am Main, Germany, assignors to Rowenta Metallwarenfabrik G.m.b.H., Offenbach am Main, Germany, a German firm
Filed Aug. 30, 1966, Ser. No. 576,776
Claims priority, application Germany, Apr. 28, 1962, R 32,569
14 Claims. (Cl. 317—85)

The invention relates to a lighter of the type used by smokers for lighting cigarettes, cigars and pipes, and more particularly to a gas-fueled electrically ignited lighter. The invention is especially suitable for, but not limited to, table lighters.

The present invention is a continuation-in-part application based upon co-pending application Ser. No. 271,700, filed Apr. 9, 1963, now abandoned. The application discloses but does not claim certain subject matter disclosed and claimed in copending application Ser. No. 574,464, filed Aug. 23, 1966.

Several attempts have been made to develop an ignition system for gas-fueled electrically ignited lighters of the general kind above referred to by providing a voltage source to generate a spark discharge which in turn is used to ignite a gaseous fuel, such as butane. However, these attempts were not successful in practice. Due to the rather high voltage required to generate a spark discharge sufficient to ignite a flow of gasified fuel, a battery capable of supplying such voltage becomes too large and too heavy to be practical, or is rapidly drained.

It is an object of the invention to provide a novel and improved gas-fueled electrically ignited lighter of the general kind above referred to the ignition system of which produces a fully adequate spark discharge by means of a small and long-lasting battery, such as a so-called hearing aid battery having a voltage output of 22.5 volts.

A more specific object of the invention is to provide a novel and improved gas-fueled electrically ignited lighter the ignition system of which drains current from the battery only when such current is actually needed, so that the battery has a very long useful life.

It is also an object of the invention to provide a novel and improved gas-fueled electrically ignited lighter the actuating means of which when operated opens a fuel discharge valve to release a flow of gasified fuel and also initiates a spark discharge igniting the released flow of fuel.

A more specific object of the invention is to provide a novel and improved gas-fueled electrically ignited lighter in which the opening of the fuel release valve and the initiation of the spark discharge are so correlated that the release of the flow of fuel slightly precedes the spark discharge, thereby assuring that combustible gas is actually present when the spark discharge occurs.

Another more specific object of the invention is to provide a novel and improved gas-fueled electrically ignited lighter in which the fuel valve locks itself in its open position so that the flame persists as long as it is desired by the user of the lighter, and is releasable by the user whenever desired, thereby extinguishing the flame. Release of the fuel valve for return into its closed position may be effected by simply placing the lighter upon a support.

Other and further objects, features and advantages of the invention will be pointed out hereinafter and set forth in the appended claims constituting part of the application.

In the accompanying drawing, a now preferred embodiment of the invention is shown by way of illustration, and not by way of limitation.

Figure 2:
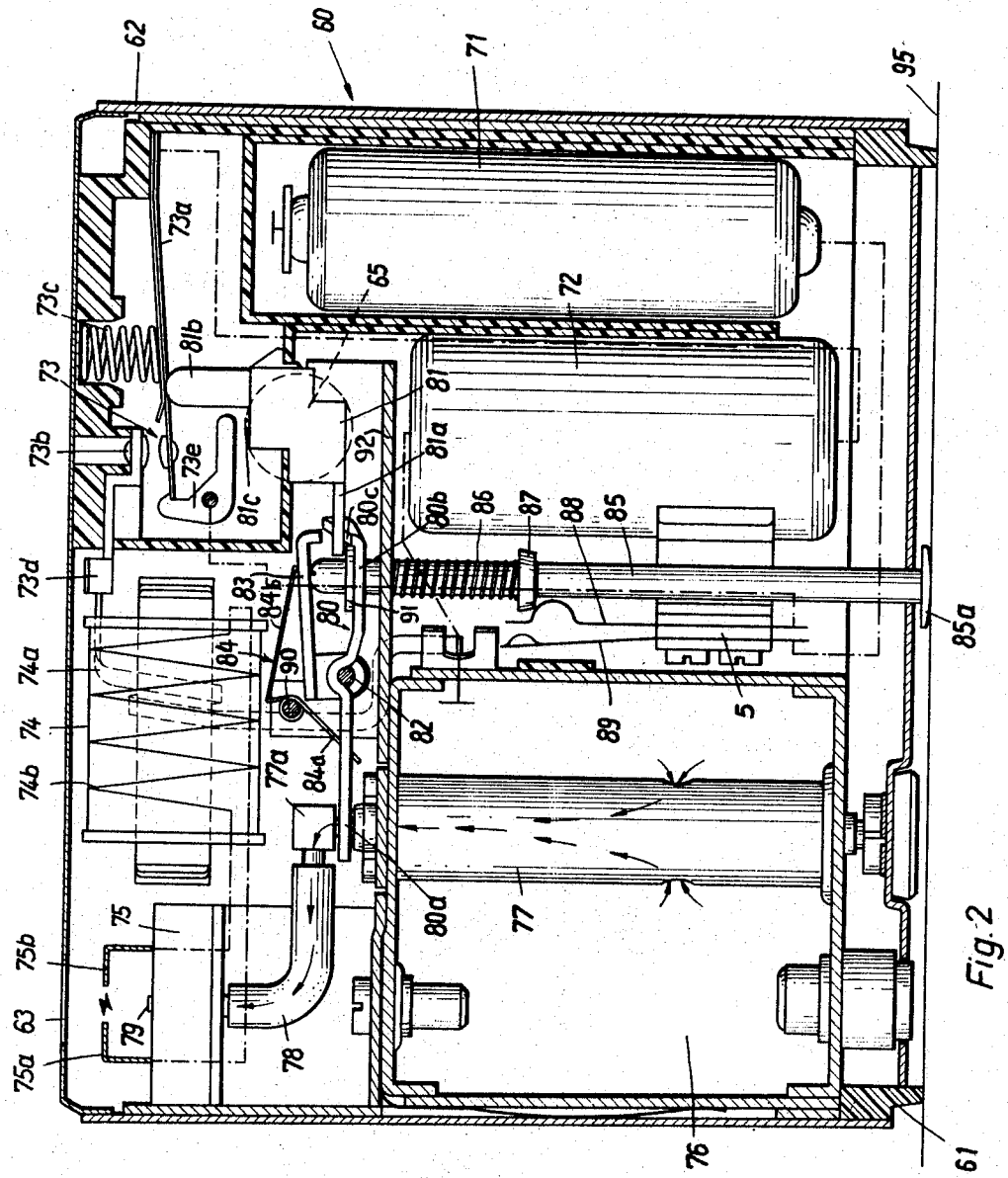
Figure 3:
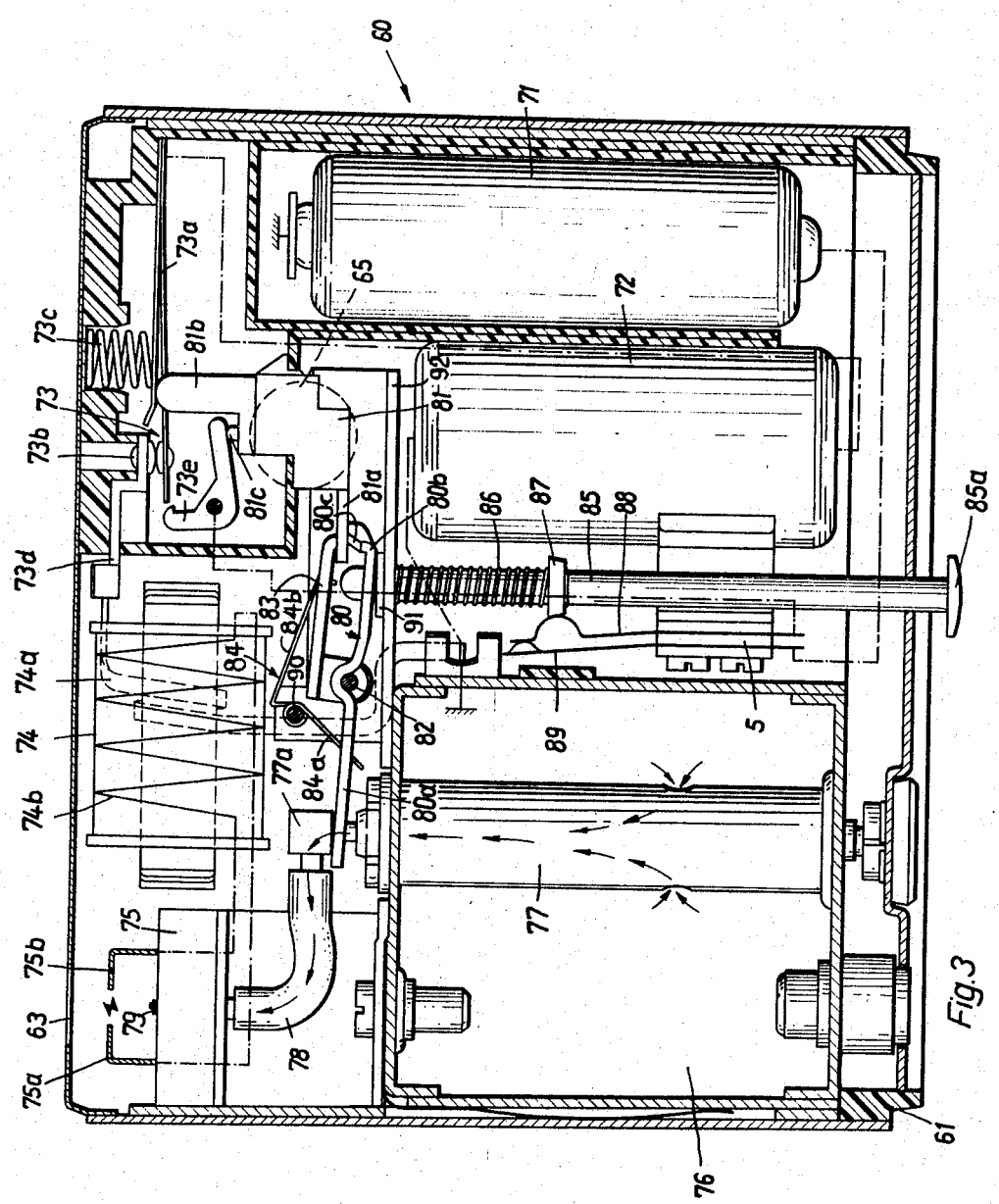
Figure 4:
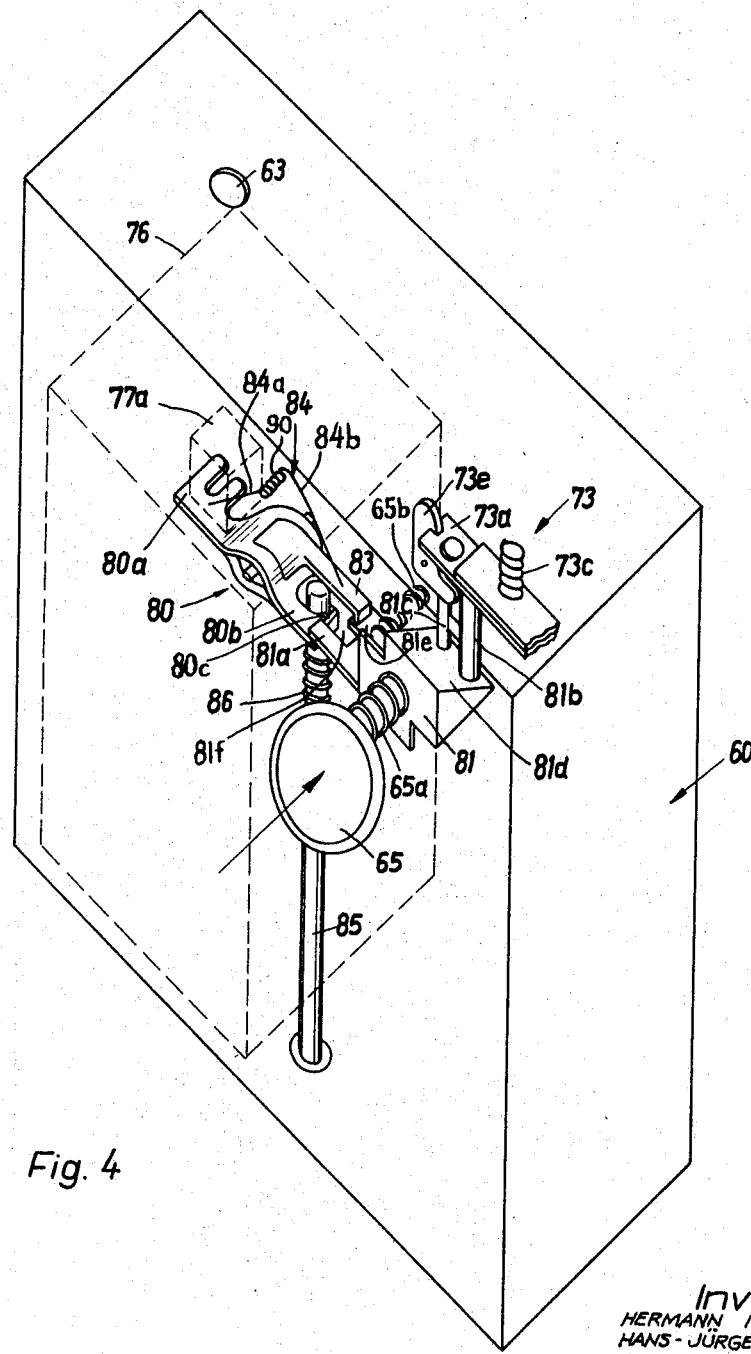
Figure 5:
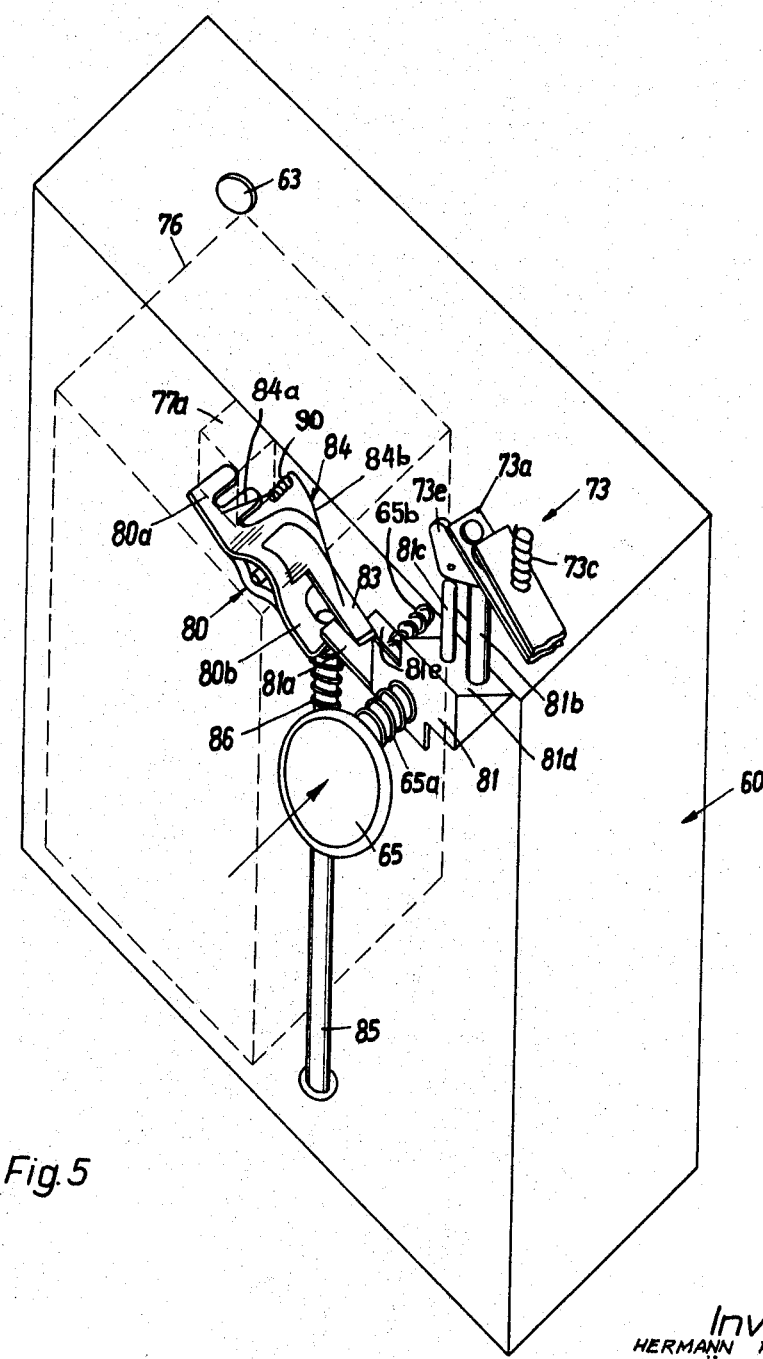

In the drawing:
FIG. 1 is a side view of a table lighter according to the invention;
FIG. 2 is an elevational sectional view of the lighter according to FIG. 1 on an enlarged scale, the casing of the lighter being removed and the mechanism of the lighter being shown in its inactive position;
FIG. 3 is a sectional view similar to FIG. 2, but showing the lighter mechanism in an operated condition;
FIG. 4 is a perspective view of the actuating means of the lighter for actuating a circuit switch and the fuel valve on an enlarged scale;
FIG. 5 is a perspective view similar to FIG. 4, but showing the respective components in a different operational position; and
FIG. 6 is a circuit diagram of the lighter.

Figure 6:
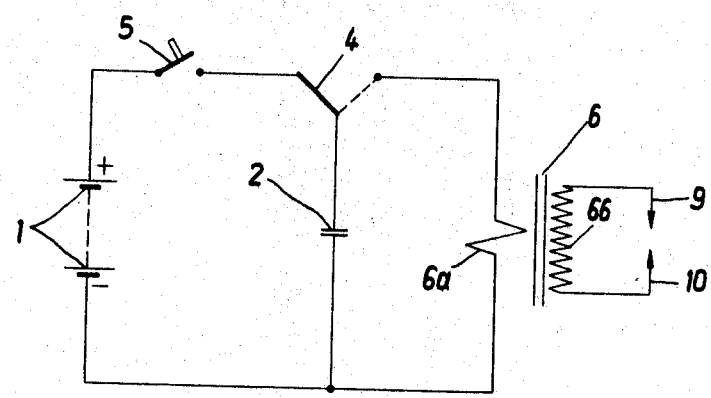

Referring now to the figures in detail, and first to FIG. 6, the circuit diagram of this figure shows a charging circuit including, serially connected, a source of voltage 1, such as a battery of the hearing aid type, for instance, a conventional 22.5 volt hearing aid battery, and a capacitor 22. The diagram further shows a discharge circuit including the primary winding 6a of a step-up transformer 6. The secondary winding 6b of the transformer has terminals 9 and 10 defining a spark gap therebetween. The primary winding is connectable by a switch 4 across the terminals of capacitor 2. The switch is common to the charging circuit and the discharging circuit. It has a movable switch arm which, when placed in the full-line position, closes the charging circuit so that the capacitor is charged by battery 1 (disregarding for the time being switch 5), and when placed in the dotted-line position closes the discharge circuit through primary winding 6a so that the capacitor will discharge through this winding.

As is evident from the diagram, the capacitor will be continuously charged by the battery when switch 4 is in the full-line position (disregarding switch 5). As is also evident, placement of the switch into the dotted-line position induces a stepped-up voltage in secondary winding 6b which will cause a spark discharge across the terminal electrodes 9 and 10. This spark discharge is utilized to ignite a flow of combustible gas, as will be more fully explained hereinafter.

A normally closed charging circuit for capacitor 2 entails a continuous drain on battery 1 due to the inherent and unavoidable leakage loss at capacitor 2. To avoid such leakage loss, a normally open switch 5 is included in the charging circuit. This switch is closed only when and while it is necessary to charge the capacitor for the purpose of using the lighter.

As has been previously indicated, one of the problems with lighters of the kind here involved is that they must be comparatively small and light, and that accordingly, the available electric energy must be utilized to the fullest extent. A switch such as switch 4, when moved by hand into the dotted-line position of FIG. 6, may or may not be rapidly placed in a position in which it is fully closed, that is, in a position in which the contact resistance between the contacts of the switch is at a minimum. There may also be a certain bounce-back between the switch contacts. The result of such imperfect closing of the switch is that the energy stored in the charged capacitor is not fully discharged through winding 6a, thereby correspondingly weakening or even preventing the spark discharge and thus rendering uncertain the ignition of the gas flow. It has been found advantaegous to effect placement of switch 4 in its discharge position by a directional force, such as a spring, which snaps the switch when released into its discharge position and retains the switch in said petition, thereby assuring a substantiallly complete and uninterrupted discharge of the capacitor through winding 6a.

Turning now to FIGS. 1 to 5, the entire mechanism of the lighter is encased in a casing 60 of suitable design. The casing has two parts, namely, a chassis or base part 61 and a cover part 62 telescoped upon the chassis. The casing is completely closed except for a flame opening 63 and louvers 64.

Operation of the lighter, in a manner which will be more fully described hereinafter, is effected by means of a button 65 fitted in a suitable opening 66 of the casing and operable from the outside of the casing by exerting a temporary pressure upon the button against the action of a return spring 65a.

The entire mechanism of the lighter, with the exception of button 65, is supported by chassis 61 and comprises a battery 71, a capacitor 72, and a switch 73 including a switch spring 73a, a stationary switch contact 73b and a coil spring 73c urging the switch spring 73a into the position of FIG. 2, in which the switch spring is disengaged from switch contact 73b. Switch contact 73b is supported by a conducting member 73d. Switch spring 73a is retainable by a spring-loaded pawl 73e, as will be more fully explained hereinafter.

The mechanism also comprises a transformer 74 having a primary winding 74a and a secondary winding 74b corresponding to transformer 6 and its windings as shown in FIG. 6. Battery 71, capacitor 72, switch 73 and the windings of transformer 74 are connected as has been explained in connection with FIG. 6. The secondary winding 74b of the transformer is connected to two electrodes 75a and 75b defining a spark gap therebetween. The two electrodes are suitably mounted on a support 75.

The mechanism of the lighter further includes a fuel tank 76 in which a suitable fuel, such as butane, is stored in liquefied form. The fuel is fed in gasified form through a fuel valve 77 including a valve control head 77a and a pipe 78 to a fuel discharge nozzle 79 which is so placed that a stream of fuel discharged therefrom will pass between electrodes 75a and 75b. The valve control head 77a is normally biased into a valve-closing position, but may be opened by the action of one arm 80a of a lever 80, the other arm 80b of which coacts with an arm 81a of a movable member 81, which in turn is actuated by button 65. Member 81 by means of a slanted surface 81d operates a stem 81b coacting with switch spring 73a and also a further stem 81c coacting with one arm of pawl 73e. Lever 80 is pivotal on a pin 82, which also pivotally supports an arm 83. A spring 84 supported by a pin 90 abuts with one arm 84a against arm 81a to bias lever 81 in counterclockwise direction and with a second arm 84b against arm 83 to bias the same in clockwise direction. Such turning of arm 83 is limited by an extension 81e which is separated from arm 81a by a gap 81f. Lever arm 80b terminates in a slanted surface 80c which is engaged with arm 81a for a purpose which will be more fully explained hereinafter. The coaction of lever 80 and member 81 and the actuation of switch 73 by manner 81 are clearly shown in FIGS. 4 and 5. FIGS. 4 shows button 65 in its rest position, and FIG. 5 in its pressed-in position to actuate member 81 and lever 80.

Arm 83 is further engageable with the upper end of a bar 85 which is downwardly biased by a spring 86. The downward movement of the bar is limited by a washer 91 abutting against chassis wall 82. The bar also mounts a collar 87, which is turn coacts with a contact spring 88 biased out of engagement with a contact spring 89, contact springs 88 and 89 constituting a switch corresponding to normally open switch 5 of FIG. 6. The other end of bar 85 protrudes from the base of chassis 61 and may terminate in an enlarged head 85a.

The operation of the lighter as hereinbefore described is as follows:

As stated before, FIG. 2 shows the lighter in its inactive or non-operated position. It is assumed that the lighter rests upon a suitable surface, indicated at 95, such as a table top, and as a result, bar 85 is pressed upwardly against the action of spring 86. Accordingly, the fuel control head 77a is closed, as lever 80 does not act upon it. Contact spring 73a is held in the disengaged position by pawl 73e, that is, switch 73 is in the position shown in FIG. 6 in full lines for switch 4. However, capacitor 72 is not being charged, since switch 88, 89, corresponding to switch 5 of FIG. 6, is also open. In other words, the circuit connections of the lighter in FIG. 2 are functionally identical with the circuit connections shown in FIG. 6.

Let it now be assumed that it is desired to use the lighter. To this end, the user lifts the lighter. Accordingly, the pressure against bar head 85a is relieved, and bar 85 is moved downwardly from the position shown in FIG. 2 into the position shown in FIG. 3 by the action of spring 86. As a result, switch 88, 89 is closed by the engagement of collar 87 with contact spring 88, and the capacitor 72 is being charged, thereby readying the lighter for use. When now the user presses button 65 temporarily toward the casing, member 81 is moved from the position of FIG. 2 into the position of FIG. 3, or from the position of FIG. 4 into the position of FIG. 5. As a result of such movement, stem 81c is lifted and turns pawl 73e from the latching position of FIG. 2 into the release position of FIG. 3. Stem 81b is also lifted and moves contact spring 73a into engagement with contact 73b against the action of spring 73c. Arm 81a of member 81 turns lever 80 from the position of FIG. 2 into the position of FIG. 3, or from the position of FIG. 4 into the position of FIG. 5, against the action of spring arm 84a by riding up on slanted surface 80c, thereby causing lifting of valve control head 77a and thus opening of the fuel valve so that a flow of fuel begins to escape from nozzle 79. The fuel valve is latched in its open position by engagement of arm 83 with gap 81f. As previously described, the latching movement of arm 83 is effected by the clockwise rotation of arm 83 by the action of spring arm 84b.

Closing of switch 73 closes the discharge circuit, or in other words, it corresponds functionally to a movement of switch 4 from the full-line position of FIG. 6 into the dotted-line position, and as a result, a spark discharge occurs, causing ignition of the fuel.

As previously stated, it is desirable that the fuel valve be opened shortly before the discharge circuit is actuated so that an adequate flow of gaseous fuel will be present between electrodes 75a and 75b before the spark discharge occurs. For this purpose the turning of pawl 73e is so arranged that contact spring 73a is released by pawl 73e only after stem 81b has moved contact spring 73a through a predetermined distance toward the stationary switch contact 73b against the action of spring 73c. Accordingly, the closing of the discharge circuit is slightly delayed in reference to the opening of the fuel valve.

All the components of the lighter mechanism are now in the position of FIG. 3 and remain in this position as long as no upward pressure is exerted upon bar 85. Accordingly, the fuel valve remains open so that the flame persists, and the charging circuit for the capacitor 72 remains closed at switch 73 as long as the user presses upon button 65.

To extinguish the flame and to return all the components of the mechanism into the position of FIG. 2, the user of the lighter must exert an upward pressure upon bar 85. Such upward pressure can be applied either by directly pressing against head portion 85a of the bar, or more conveniently, by placing the lighter upon a surface, such as surface 95. As is evident, upward pressure upon bar 85 displaces the same so that collar 87 releases contact spring 88, whereby switch 88, 89 (corresponding to switch 5 of FIG. 6) is reopened. The bar will exert upward pressure upon arm 83 so that the arm is forced out of the gap 81f between arm 81a and extension 81e, Member 81 is now free to be returned from the position of FIG. 5 into the position of FIG. 4 by the action of a return spring 65b. The return movement of member 81 causes arm 81a to ride down on slant 80c, thereby freeing lever 80 for pivotal movement into the fuel valve-closing position by the action of spring arm 84a. Moreover, contact spring 73c is now moved into its position disengaged from switch contact 73b by the action of spring 73c and is latched in this position by re-engagement with pawl 73e. In other words, the lighter of FIGS. 2 and 3 is again in the condition shown in FIG. 6 with respect to its circuit connections. As is evident from the previous description, switch 73 and fuel valve 77 are simultaneously actuated for closing of the switch and the valve, respectively, by pressing upon button 65, but return independently into the rest positions. The switch is opened immediately upon release of the button, that is, before member 81 has reached the rest position according to FIG. 4.

While this invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An electrically ignited gas-fueled lighter comprising, in combination: a fuel tank; a normally closed fuel valve for discharging a flow of gasified fuel from said tank upon opening of the valve; an ignition system including a voltage source, electrodes defining a spark gap therebetween, and normally open switch means for connecting said voltage source and said electrodes to effect a spark discharge across said spark gap, said spark gap being disposed in the path of the fuel discharged through said valve; a pivotally mounted two-armed valve control lever, one arm of said lever coacting with said valve to open the same in one pivotal position of said lever and to close the valve in another pivotal position of the lever; a movable mounted switch control member coacting with said switch means and displaceable between a switching position moving the switch means into the closed position and an initial position freeing the switch means for return into the open position; coacting cam means on said control member and the other arm of said lever, said cam means upon displacement of the control member toward the switch-closing position pivoting said lever into the valve-opening position; releasable catch means coacting with said control lever to retain the same in the valve-opening pivotal position; and release means coacting with said catch means for releasing the same.

2. A lighter according to claim 1, wherein said cam means comprise a slanted cam surface on said other arm of the control lever, said cam surface being slidably engaged by a portion of said control member, the position of said engaged control member portion in reference to the cam surface controlling the pivotal position of the control lever.

3. A lighter according to claim 2, wherein the cam surface on the lever arm and the control member portion coacting therewith are so correlated that said control member reaches its position causing pivoting of the control lever into its valve-opening position prior to reaching its position causing closing of said switch means.

4. A lighter according to claim 1, wherein said catch means comprise a pivotally mounted arm and a recess in said control member engageable with said arm in the position of the control member causing opening of the fuel valve; and wherein said release means comprises a member selectively movable into a position engaging said arm to move the same out of engagement with said recess, thereby freeing said control member for return into an initial position releasing the control lever for return thereof into its valve-closing pivotal position.

5. A lighter according to claim 4, and comprising first spring means biasing said control lever into its valve-closing position, second spring means biasing said arm into engagement with said recess, and third spring means biasing said control member into its initial position.

6. A lighter according to claim 1, wherein said switch means has a stationary switch contact and a movable switch contact, and further comprising second releasable catch means retaining said movable switch contact in an open position, a first movable actuating element engageable with said second catch means to release the same, and a second movable actuating element engageable with said movable switch contact to move the same into its switch-closing position, said actuating elements coacting with said control member for first moving said first element into its position releasing the second catch means and then moving said second element into its switch-closing position upon displacement of the control member from its initial position toward said switch-closing position.

7. A lighter according to claim 6 and comprising spring means coacting with said movable switch contact to bias the same into its open position for re-engagement by the second catch means upon return of the control member into its initial position.

8. A lighter according to claim 1 and comprising a lighter casing, and an actuating member movably supported by said casing, said actuating member coacting with said control member for displacing the same toward its switch-closing position and being operable from the outside of the casing.

9. A lighter according to claim 1, wherein said release means comprise a movable release bar, and directional force means biasing said bar into an inactive position spaced apart from said catch means, said bar being selectively movable into an active position engaging the catch means for releasing the same.

10. A lighter according to claim 9 and comprising a lighter casing, said bar being slidably guided in said casing and having a portion protruding therefrom for actuation of the bar from the outside of the casing.

11. A lighter according to claim 10, wherein said bar protrudes from the bottom wall of the casing for movement of the bar into engagement with the catch means by the weight of said lighter casing when the same is placed upon a supporting base.

12. A lighter according to claim 1, wherein said catch means comprise a pivotally mounted arm and a recess in said control member engageable by said arm in the position of the control member causing opening of the fuel valve, and wherein said release means comprise a release bar selectively movable from an inactive position into a release position engaging said arm for lifting the same out of engagement with said recess to free said control member for return into its initial position, thereby releasing the control lever for return into the valve-closing pivotal position, and a spring means biasing said arm into its inactive position.

13. A lighter according to claim 1, wherein said ignition system comprises a capacitance means connected in a charging circuit with said voltage source, said electrodes being inductively coupled to said capacitance means for generating a spark discharge across said spark gap by discharge of the capacitance means, and wherein said ignition system further comprises a second normally open switch means included in said circuit connection of the voltage source and the capacitance means to open said charging circuit, and wherein said release means comprises a movable release bar, and a directional force means biasing said bar into an inactive position spaced apart from said catch means, said bar being selectively movable into an active position engaging the catch means for releasing the same, said second switch means including a stationary switch contact and a movable switch contact, said movable switch contact being controllable by said release bar, movement of the release bar from its inactive position into its active position closing said second switch means, thereby closing said charging circuit.

14. A lighter according to claim 13, wherein said release bar has secured thereto a switch control element, said control element engaging said movable switch contact of the second switch means for moving said contact into a position closing the second switch means upon movement of the release bar into its active position and releasing said movable switch contact upon movement of the bar into its inactive position.

References Cited by the Examiner

UNITED STATES PATENTS

| 1,894,006 | 1/1933 | Rossi et al. | 317—85 X |
| 1,895,032 | 1/1933 | Fisher | 317—87 X |
| 1,982,561 | 11/1933 | Williams | 317—85 |
| 2,482,794 | 9/1949 | Peterson | 67—7 |
| 2,888,066 | 5/1959 | Wilson | 158—27.4 |

FOREIGN PATENTS

| 80,300 | 3/1951 | Czechoslovakia. |
| 1,183,510 | 1/1959 | France. |

RICHARD M. WOOD, *Primary Examiner.*

V. Y. MAYEWSKY, *Assistant Examiner.*